Sept. 13, 1955 SHING RIU LIU 2,717,542
CONTINUOUSLY PHOTOGRAPHING WIDE ANGLE CAMERA
Filed Oct. 20, 1951 2 Sheets-Sheet 1
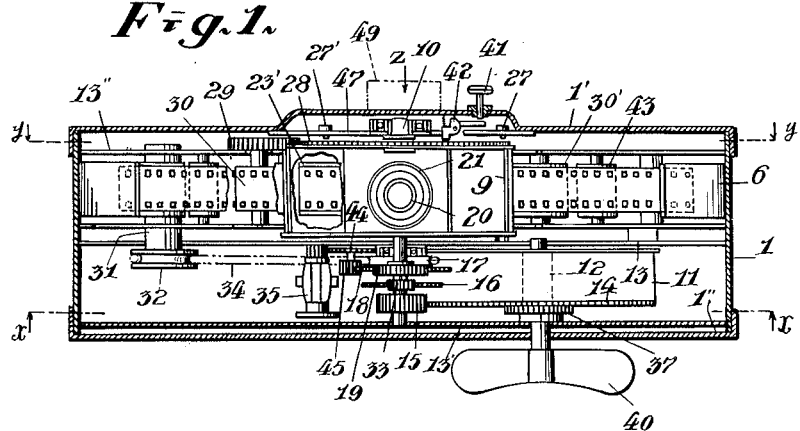
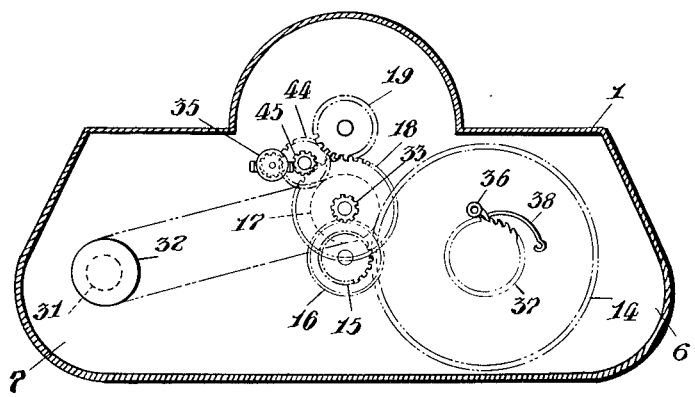
INVENTOR.
Shing Riu Liu
BY Robert E. Burns
ATTORNEY.

Sept. 13, 1955 SHING RIU LIU 2,717,542
CONTINUOUSLY PHOTOGRAPHING WIDE ANGLE CAMERA
Filed Oct. 20, 1951 2 Sheets-Sheet 2

INVENTOR.
Shing Riu Liu
BY Robert E. Burns
ATTORNEY.

United States Patent Office 2,717,542
Patented Sept. 13, 1955

2,717,542

CONTINUOUSLY PHOTOGRAPHING WIDE ANGLE CAMERA

Shing Riu Liu, Shinjuku-ku, Tokyo-to, Japan

Application October 29, 1951, Serial No. 252,294

Claims priority, application Japan October 31, 1950

1 Claim. (Cl. 95—16)

The present invention relates to a continuously photographing wide angle camera characterized by a construction which permits the film to be exposed to the light along a wide angle of about 150° by the rotation of a rotating circular cylinder in a predetermined direction, a lens supporter being carried by the cylinder in such manner that the nodal point of the lens is situated in the rotation center of the cylinder. The object of this invention is to provide a wide angle camera which can photograph continuously very wide angle images by means of relatively simple operation.

The present invention will be clear from the following explanation in connection with the accompanying drawings of an example of this invention.

Figure 3:
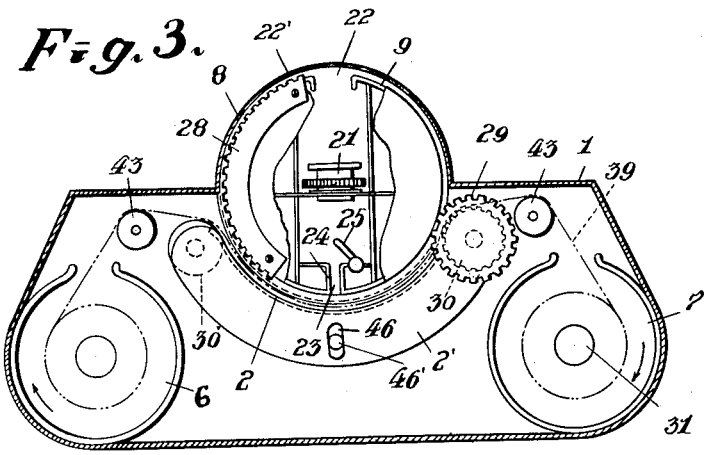
Figure 4:
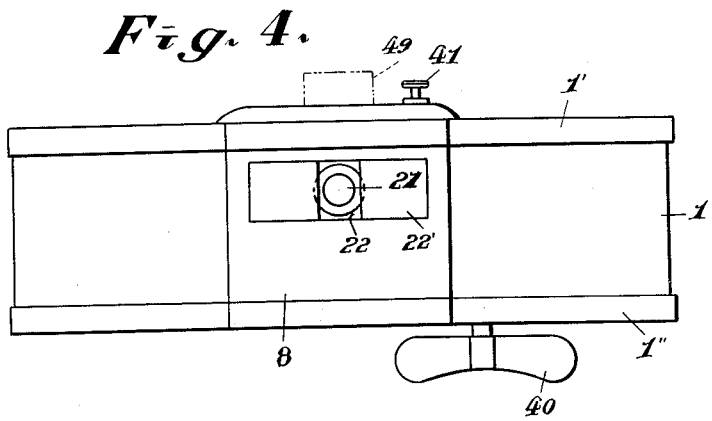
Figure 5:
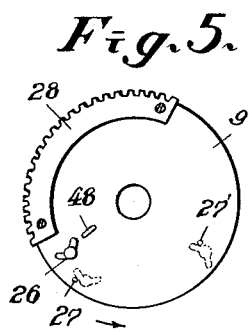

Fig. 1 is a vertically sectioned view of a camera constructed in accordance with this invention. Fig. 2 is a plan view partly in section along the plane passing through the line x—x of Fig. 2 and shows the driving parts mainly. Fig. 3 is a plan view partly in section transversely along the plane passing through the line y—y of Fig. 2 with the supporting plate 13″ removed. Fig. 4 is a plan view of Fig. 1, and Fig. 5 shows the position of the rotating circular cylinder 9 as viewed in the direction of the arrow Z in Fig. 1.

In the drawings; 1 is a camera case provided with the cover plates 1′, 1″, 2′ is an arcuate frame plate supporting a film holding plate 2 at its upper portion and provided with an elongated hole 46, in which is inserted a pin 46′ fixed on the supporting plate 13″. Therefore, the frame plate 2′ can be fixed at any height by means of fastening the said pin 46′ by a nut screwed on pin 46′. 6 is a film storing part arranged at the under part of an end of the film holding plate 2, 7 is a film winding part arranged at the under part of the other end of the plate 2. 8 is a cylindrical frame fixed on the case 1 at the front part of the film holding plate 2 and between frame 8 and the plate 2 a curved gap is made, through which a film can pass freely. 9 is a rotating circular cylinder arranged in the cylindrical frame 8 and is so fixed on a shaft 10 which is concentric with the center axis of the cylindrical frame 8 as to be rotated freely. 23′ is a rectangular window made in the cylindrical frame 8 at its part facing the film inserted between the frame 8 and the plate 2. 22 is a light window made in the front wall of the rotating cylinder 9, 22′ is a light window made in the cylindrical frame 8 at the front part of the window 22. In the rotating cylinder 9, a lens supporter 21 provided with a lens 20 in its internal part is so supported that the nodal point of the lens is situated in the rotation center of the cylinder 9 and the lens may face the light window 22. 23 is a light exposing shutter window made on the side wall of the rotating cylinder 9 at the rear part of the lens 20. At this time, the size of the window 23 is selected so that its longitudinal width may be equal to that of the film and its transverse width may be narrow and its outer face can slide along the internal surface of the cylindrical frame 8.

24 is a shading wall used for separating the window 23 from the surroundings and is provided with a shutter 25. This shutter is arranged so that it may open the light exposing shutter window 23 when this window faces the film and can shut at the instant the window leaves the film surface.

For the above operation of the shutter 25, a pivot of the shutter 25 projects through the wall of the cylinder 9 and to this projected part a crank operator 26 is fixed and a pin 27 for opening and a pin 27′ for closing the shutter 25 are fixed on the internal surface of one 47 of the two frames supporting the cylinder 9, wherein the fixed positions of the pins 27 and 27′ are selected so that the shutter may be rotated in its opening or closing condition respectively in accordance with the engagement between the operator 26 and the pins 27 of 27′. A spring is inserted around the root of the shutter 25 so as to protect the release or reverse rotation of the pivot of the shutter during the opening or closing condition of the shutter. Such spring, however, is not shown in the drawings.

Each of the pins 27, 27′ is fixed respectively at the position corresponding to the starting or ending point of light exposure of the film. However, such position may be different more or less in accordance with the form of the crank operator 26. In this example, as is shown in Fig. 5, the distance between the pin 27 and the axis of the rotating cylinder 9 is longer than that between the pin 27′ and the said axis. Therefore, the shutter 25 will be opened by the pin 27 and closed by the pin 27′ in case of rotation of the cylinder 9 in the direction of the arrow. As the pins 27, 27′ are fixed at the positions designated in Fig. 5, so the shutter 25 will be opened at the instant of engagement of one arm of the operator 26 with the pin 27 and also at the moment directly before the exposure of the film through the window 23 and will maintain its opened condition during the progress of the window 23 along the film, resulting in a continuously moving exposure on the film. On the other hand, the shutter 25 will be closed at the end of film exposure by engagement of the other arm of the operator 26 with the pin 27′.

To effect intermittent progress of the film during the closing condition of the shutter 25, a toothed ring 28 is fixed on the upper cover plate of the cylinder 9, a toothed wheel 29 is so arranged in one end of the case 1 as to mesh with the said ring 28, a sprocket wheel 30 is fixed to the shaft of the wheel 29, a film shifting roller 39′ is arranged in the other part of the case 1, and the film 39 is so carried on the sprocket wheel 30 and the roller 30′ as to be shifted towards the film winding part 7 from the film storing part 6. A pulley 32 is fixed on the film winding shaft 31, a pulley 17 is fixed on the shaft of a toothed wheel 18, and a film winding belt 34 is carried between the pulleys 32 and 17. 11 is a spiral spring, 12 is a shaft to which one end of the spring 11 is fixed, 13, 13′ are frame plates supporting both ends of the shaft 12, and the other end of the spring 11 is fixed to the said frame plates. 14 is a toothed wheel fixed on the shaft 12 of the spring 11, 15 is a small toothed wheel in mesh with the wheel 14, 16 is a toothed wheel fixed on the shaft of the wheel 15, 33 is a toothed wheel in mesh with the wheel 16, and the pulley 17 and the toothed wheel 18 are fixed on the shaft of this toothed wheel 33. 19 is a toothed wheel fixed on the shaft 10 in mesh with the toothed wheel 18. 35 is a speed regulator which is so arranged as to be rotated at high speed by a toothed wheel 45 in mesh with the toothed wheel 18 and a toothed wheel 44 fixed on the shaft of the said wheel 45, 36 is a hanger pivoted on the side surface of the wheel 14, 37 is a clutch wheel fixed on the shaft 12 under clutching condition with the hanger 36, 38 is a spring pressing the hanger 36 towards the clutch wheel 37, 40 is a butterfly nut, 41 is a shutter-button, 42 is a stopper for stopping the rotating cylinder 9, and this stopper is so arranged that it can engage with a projected pin 48 Fig. 5 fixed on the cylinder 9. 43 are rollers for guiding the film 39. 49 is a finder, of which detailed construction is omitted, because its construction is generally well-known.

The operation of the above mentioned example is as follows.

At first, the film may be inserted by detaching the cover plate 1' from the case 1, backing the frame plate 2' by sliding it by means of elongated hole 46 upon relaxation of the nut screwed on the pin 46' resulting in disengagement of the toothed wheels 28 and 29, installing the film 39 in the film storing part 6, pulling out one end of the film through the guide rollers 43 and putting it on the sprocket wheel 30 with the side holes of the film engaged with the teeth of the wheel 30, moving the said one end of the film towards the film winding part 7, fixing the said end on the winding shaft 31, advancing the said frame plate 2' until the toothed wheel 28 meshes with the toothed wheel 29, fixing the cover plate 1' on the case 1, and stopping the rotating cylinder 9 by engaging the stopper 42 with the projected pin 48 on the head plate of the cylinder 9. And then the spiral spring 11 is wound up by twisting the butterfly nut. At this time, the rotating cylinder 9 will not rotate reversely, because it is held by the stopper 42.

When the shutter button 41 is pressed with the lens directed towards the object to be photographed, the engagement between the stopper 42 and the projector 48 is released and the rotating cylinder 9 rotates in the direction of the arrow in Fig. 5 by the force of the spiral spring 11.

During rotation of the cylinder 9, one arm of the operator 26 engages the shutter operating pin 27 resulting in the opening of the window 23 and the engagement ceases as soon as the window 23 opens perfectly. And then the other arm of the operator 26 engages the shutter closing pin 27' resulting in the closing of the exposing window 23 and the engagement ceases as soon as the window 23 closes perfectly. To maintain the opening and closing conditions, a spring is arranged on the pivot of the shutter 25.

The film should be shifted only during rotation of the rotating cylinder 9 with the window 23 closed (that is, till the cylinder 9 reaches the point at which the window 23 is to be opened again). Such shifting, according to this example, can be done by engaging the toothed wheel 29 supported in the case 1 with the toothed ring 28 fixed on the upper plate of the rotating cylinder 9. That is, according to such engagement, the film 39 will be shifted from the film storing part 6 through the sprocket wheel 30 fixed to the shaft of the toothed wheel 29 towards the film winding part 7.

As is clear from the foregoing, the film rests during the exposure of the film and moves during the film shading. Therefore, the rotating cylinder 9 rotates continuously only in one direction, while the film moves intermittently. However, if the shutter button 41 is released, then the stopper 42 engages with the said button 41 and stops the rotation of the cylinder 9. In the embodiment of this invention, any other driving power instead of the spiral spring may be used as the prime mover.

It has been, hitherto, customary to use a motion picture camera in order to photograph any very wide range. However, the conventional movie camera has various inconveniences or defects when it is desired to photograph almost instantly a very wide angle.

According to the camera of this invention, it is easily possible to photograph a wide angle-range in about one-fourth the time of one element of the film of a conventional motion picture camera. Therefore, it is possible also to photograph instantly any landscape of wide range and large crowds of people and so it is suitable for photographing land surface of wide range from an airplane or for photographing any sea surface of wide range from a ship.

Furthermore, according to the camera of this invention, the nodal point of the lens can coincide uniformly with all surfaces of the film by means of moving exposure of the shutter window from one end to the other end of a wide element of the film. Therefore, there is no chance that any unclear parts or points will occur at the circumferences of the film and it becomes possible to make a very clear photograph.

Having described my invention, I claim as follows:

In a continuously photographing panoramic camera, the combination in a case of means defining an arcuate path for the film to be exposed, a circular cylinder rotatably supported in said case for continuous unidirectional rotation, a stationary cover covering said cylinder and being provided with a window extending over an arcuate angle of about 150°, a lens supporter disposed in said cylinder and supporting a lens with the nodal point of the lens situated at the rotation center of said cylinder, said cylinder being provided with a light window at the front of the lens and a light exposing shutter window at the rear of the lens for directing the light on the portion of the film in said arcuate path, a driving mechanism for continuously rotating said cylinder unidirectionally in a predetermined direction, a shutter device for opening the shutter window only during film exposing process over a wide angle and adapted to close the said window after completion of exposure of one section of film length corresponding to said wide exposing angle, and a driving gear mechanism for moving said film along said path, means associated with said circular cylinder for actuating said driving gear mechanism only during rotation of said cylinder through a predetermined arc, said arc corresponding to the period of cylinder rotation following exposure and before the succeeding exposure whereby the lens containing cylinder may be rotated continuously unidirectionally for scores of revolutions per one second while predetermined sections of the film corresponding to the wide exposing angle of the camera are intermittently stationary and the film may be wound up at the completion of each exposure, resulting in intermittent winding up of the film and in continuous photographing of scores of sections of the film.

References Cited in the file of this patent
UNITED STATES PATENTS

| | | |
|---|---|---|
| 511,133 | Fretwell | Dec. 19, 1893 |
| 638,582 | Hopkinson | Dec. 5, 1899 |
| 647,890 | Stone | Apr. 17, 1900 |
| 671,154 | Angsten | Apr. 2, 1901 |
| 704,438 | Conti | July 8, 1902 |
| 1,257,656 | Warman | Feb. 26, 1918 |
| 1,943,378 | Elms | Jan. 16, 1934 |
| 2,596,746 | Waller | May 13, 1952 |